(12) United States Patent
Jin et al.

(10) Patent No.: US 11,304,378 B2
(45) Date of Patent: Apr. 19, 2022

(54) AQUATIC WEED PLANTING PLATE FOR AQUARIUM

(71) Applicant: GUILIN UNIVERSITY OF TECHNOLOGY, Guangxi (CN)

(72) Inventors: Xin Jin, Guangxi (CN); Shidong Li, Guangxi (CN); Peng Wang, Guangxi (CN); Ying Song, Guangxi (CN)

(73) Assignee: GUILIN UNIVERSITY OF TECHNOLOGY, Guangxi (CN)

( * ) Notice: Subject to any disclaimer, the term of this patent is extended or adjusted under 35 U.S.C. 154(b) by 78 days.

(21) Appl. No.: 16/857,333

(22) Filed: Apr. 24, 2020

(65) Prior Publication Data
US 2020/0352108 A1    Nov. 12, 2020

(30) Foreign Application Priority Data
May 9, 2019 (CN) .......................... 201910384286.0

(51) Int. Cl.
*A01G 9/02* (2018.01)
*A01K 63/00* (2017.01)
(Continued)

(52) U.S. Cl.
CPC ........... *A01G 9/028* (2013.01); *A01G 9/0295* (2018.02); *A01K 63/006* (2013.01); *A01K 63/06* (2013.01); *A01K 63/10* (2017.01)

(58) Field of Classification Search
CPC ...... A01K 63/006; A01K 63/10; A01G 9/027; A01G 9/028; A01G 9/0297; A01G 9/12; A47G 33/12
(Continued)

(56) References Cited

U.S. PATENT DOCUMENTS

| 3,119,774 | A | * | 1/1964 | Arak | ................... | A01K 63/045 |
| | | | | | | 210/167.23 |
| 4,118,892 | A | * | 10/1978 | Nakamura | ............. | A01G 9/025 |
| | | | | | | 47/65.9 |

(Continued)

FOREIGN PATENT DOCUMENTS

| DE | 9214345 U1 | * | 12/1992 | ............. | A01G 9/028 |
| FR | 2190351 A2 | * | 2/1974 | ............. | A01G 9/028 |

(Continued)

OTHER PUBLICATIONS

English-language translation of FR 2190351 (Year: 1974).*

*Primary Examiner* — Lisa L Tsang
(74) *Attorney, Agent, or Firm* — Shumaker, Loop & Kendrick, LLP; James D. Miller

(57) ABSTRACT

An aquatic weed planting plate for an aquarium is provided. The aquatic weed planting plate for aquarium includes a plate body and at least four feet. A plurality of planting holes is formed in the plate body at intervals. A plurality of dirt collecting holes is formed around each planting hole. The plate body is provided with fixing devices for fixing aquatic weeds, and each fixing device corresponds to one planting hole. The fixing device includes a fixing sleeve, two clamping members and a luminous ring. The plate body is provided with nets for collecting dirt, each net corresponds to one dirt collecting hole, the lower portion of each net is provided with a connecting tube; a plurality of conveying pipes is also arranged below the plate body, each conveying pipe is communicated with the plurality of connecting tubes, each connecting tube is communicated with the corresponding conveying pipe.

9 Claims, 3 Drawing Sheets

(51) Int. Cl.
 *A01K 63/10* (2017.01)
 *A01G 9/029* (2018.01)
 *A01K 63/06* (2006.01)

(58) Field of Classification Search
 USPC ....... 119/253, 264; 47/65.9, 66.5, 44, 41.13, 47/40.5
 See application file for complete search history.

(56) References Cited

U.S. PATENT DOCUMENTS

| | | | | |
|---|---|---|---|---|
| 4,820,556 | A * | 4/1989 | Goldman | A01K 63/006 119/253 |
| 4,897,188 | A * | 1/1990 | Ogawa | A01K 63/045 210/167.22 |
| 4,967,508 | A * | 11/1990 | Reynolds | A47G 33/12 248/523 |
| 5,160,431 | A * | 11/1992 | Marioni | A01K 63/045 119/259 |
| 5,187,894 | A * | 2/1993 | Ripley, Sr. | A63C 19/00 47/86 |
| 5,367,985 | A * | 11/1994 | Wilkins | A01K 63/042 119/263 |
| 5,451,443 | A * | 9/1995 | Wechsler | A01K 63/006 428/99 |
| 5,690,054 | A * | 11/1997 | Allen | A01K 63/003 119/259 |
| 6,385,903 | B1 * | 5/2002 | Diller | A01G 9/0295 47/66.5 |
| 6,694,672 | B1 * | 2/2004 | Hergeth | E01C 13/083 47/65.9 |
| 8,424,257 | B2 * | 4/2013 | Jenkins | E04B 5/43 52/177 |
| 10,602,725 | B1 * | 3/2020 | Ewald | A01K 61/73 |
| 2003/0070357 | A1 * | 4/2003 | Huang | A01G 9/00 47/66.3 |
| 2005/0183331 | A1 * | 8/2005 | Kania | A01K 61/70 47/65.5 |
| 2014/0026477 | A1 * | 1/2014 | Ferguson | A47G 33/12 47/40.5 |
| 2016/0227713 | A1 * | 8/2016 | Haarburger | A01G 9/12 |
| 2018/0027749 | A1 * | 2/2018 | Frew | A01G 9/249 |

FOREIGN PATENT DOCUMENTS

| | | | | |
|---|---|---|---|---|
| FR | 2816167 A1 * | 5/2002 | | A01G 9/028 |
| JP | 03123606 A * | 5/1991 | | |
| KR | 20160113919 A * | 10/2016 | | |

\* cited by examiner

AQUATIC WEED PLANTING PLATE FOR AQUARIUM

CROSS-REFERENCE TO RELATED PATENT APPLICATION

This patent application claims the benefit of Chinese Patent Application No. 201910384286.0 filed May 9, 2019, the entire contents of which are hereby incorporated herein by reference.

FIELD

The present invention relates to the technical field of ornamental fish aquarium equipment, and in particular to an aquatic weed planting plate for an aquarium.

BACKGROUND

Aquatic weeds planted in an aquarium can greatly improve the ornamental value of the aquarium. Generally, the aquatic weeds are planted by burying their roots in the bottom sands or tying weights to their roots. By using the method of burying the roots of the aquatic weeds in the bottom sands, operations are tedious; what is more, excrement generated by aquatic animals is difficult to clean after it enters the bottom sands. By using the method of tying the weights to the roots of the aquatic weeds, the growth of the aquatic weeds is unfavorable, and the ornamental value of the aquatic weeds is reduced. Additionally, dirt, including the excrement generated by the aquatic animals, drifts away in the aquarium to reduce the ornamental value of the aquarium and pollute the water. Currently, a main dirt cleaning method is to filter by using a filtering system, but to a small aquarium without the filtering system, the dirt can be cleaned only by sucking and changing the water; so, there is a problem that the generated dirt cannot be cleaned in a short time, regardless of whether an automatic filtering system is mounted. Therefore, it is necessary to propose an aquatic weed planting plate for the aquarium to solve the above problems.

SUMMARY

In view of this, the objective of the present invention is to propose an aquatic weed planting plate for aquarium, which solves the problems of tedious operations and unfavorable aquatic weed growth when aquatic weeds are planted in an aquarium, and also solves the problem that aquatic animal excrement is difficult to clean in the aquarium.

To achieve the above objective, the present invention adopts the following technical solution: An aquatic weed planting plate for an aquarium comprises a plate body and at least four feet. The plate body is a rectangular plate. The at least four feet are arranged on the bottom surface of the plate body, and four corners of the bottom surface of the plate body are respectively provided with one foot. A plurality of planting holes is formed in the plate body at intervals. A plurality of dirt collecting holes is formed around each planting hole. The planting holes and the dirt collecting holes penetrate through the top surface and the bottom surface of the plate body. The dirt collecting hole is trumpet-shaped, and its large-diameter end is positioned on the top surface of the plate body.

The plate body is provided with fixing devices for fixing aquatic weeds, and each fixing device corresponds to one planting hole. The fixing device comprises a fixing sleeve, two clamping members and a luminous ring. The fixing sleeve is arranged on the plate body and is coaxial with the planting hole. The top surface of the fixing sleeve is higher than the top surface of the plate body. The two clamping members are arranged at the upper portion of the fixing sleeve and are bilateral symmetry. The clamping member comprises an arc clamping plate, a screw and an adjustment knob. The two arc clamping plates of the two clamping members are arranged in the fixing sleeve, and their two recesses are disposed opposite to each other. The middle portion of the arc clamping plate is provided with a fitting part. The screw is horizontally arranged; one end of the screw is inserted into the fixing sleeve and is rotationally connected with the fitting part of the arc clamping plate; the screw is in threaded connection with the fixing sleeve; one end, outside the fixing sleeve, of the screw is fixedly connected with the adjustment knob. The luminous ring sleeves the periphery of the fixing sleeve.

The plate body is provided with nets for collecting dirt, and each net corresponds to one dirt collecting hole. The net is located just under the dirt collecting hole. The lower portion of the net is funnel-shaped and is provided with a connecting tube. A plurality of conveying pipes is also arranged below the plate body, each conveying pipe is communicated with the plurality of connecting tubes, and each connecting tube is communicated with the corresponding conveying pipe. One end of the conveying pipe is closed while the other end passes through the plate body and is located above the plate body.

Preferably, the plate body is made of ceramic, and its thickness is in the range of 5-15 mm. Using such arrangement, the plate body can greatly sink into the bottom, does not pollute the water quality, does not influence the survival of aquatic lives and has excellent ornamental value.

Preferably, the height of the foot is in the range of 15-25 mm. Using such arrangement, there is enough space below the plate body such that the roots of the aquatic weeds can greatly grow, and the plate body occupies the space of the aquarium as small as possible.

Preferably, the fixing sleeve is detachably connected with the plate body, and the inner diameter of the fixing sleeve is in the range of 20-30 mm. Using such arrangement, the fixing sleeve has the enough space for placement of the aquatic weeds, and the aquatic weeds obtain the enough growth space.

Preferably, the fixing sleeve is in threaded connection with the plate body. Using such arrangement, the fixing sleeve is convenient to mount and detach and is practical.

Preferably, smooth transition parts are arranged at four corners of the plate body, the edges of the dirt collecting holes, the edges of the planting holes and the edges of the fixing sleeves. Using such arrangement, the plate body can effectively prevent from abrading the aquarium and scratching the aquatic animals.

Preferably, the net is detachably connected with the plate body. Using such arrangement, the net is convenient to mount and detach and can be timely cleaned and sterilized.

Preferably, the arc clamping plate is made of soft plastic. Using such arrangement, the arc clamping plate can protect the aquatic weeds from being scratched when fixing the aquatic weeds.

Preferably, two adjacent sides of the plate body are respectively provided with a first connector while the other two sides are respectively provided with a second connector. The first connector can be detachably connected with the second connector. Using such arrangement, a user can conveniently combine multiple aquatic weed planting plates as required.

By adopting the above technical solution, the present invention has the following beneficial effects:
1. The planting holes are formed in the plate body. The plate body is also provided with the fixing devices for fixing the aquatic weeds. Therefore, the aquatic weeds do not float upwards and incline under the disturbance of the aquatic animals; such arrangement ensures the stability of the planted aquatic weeds and facilitates the growth of the aquatic weeds. The fixing device comprises the fixing sleeve and the two clamping members. The fixing sleeve and the planting hole are coaxially arranged. The distance between the two clamping members is adjustable such that the fixing device can be used for fixing different sizes of the aquatic weeds and has excellent universality. During planting of the aquatic weeds, first, the aquatic weeds firstly pass through the fixing sleeve and the planting hole at the same time; second, the distance between the two clamping members is adjusted to fix the aquatic weeds; so, the planting of the aquatic weeds is very simple. During adjustment of the clamping members, a proper distance is reserved between the clamping member and the aquatic weeds to facilitate the growth of the aquatic weeds.
2. The luminous ring is arranged on the fixing sleeve, so it can effectively attract the aquatic animals close to the planting hole. The plurality of dirt collecting holes is arranged around the planting hole so that excrement generated by the aquatic animals can be effectively collected. The aquatic animals have the characteristics of phototaxis and nocturnal bowl movement; so, the luminous ring emits the light and can attract the aquatic animals to move around the planting hole; at this time, the excrement generated by the aquatic animals can be gathered in the dirt collecting holes and finally is deposited in the nets below the dirt collecting holes. The dirt collecting hole is trumpet-shaped; its large-diameter end is located on the top surface of the plate body so that the dirt collecting hole is convenient to collect the excrement; its small-diameter end is located on the bottom surface of the plate body so that the disturbance of water flow to the excrement can be reduced. Moreover, the excrement is collected at the lower portion of the plate body; so, the ornamental value of the aquarium is not influenced. The excrement can not be cleaned if it does not influence the water quality; therefore, the plurality of nets around the planting hole can form a fertilizer ring to provide abundant nutrients for the roots of the aquatic weeds to facilitate the growth of the aquatic weeds. Additionally, the luminous ring has a great decoration function to the aquarium and can improve the ornamental value of the aquarium.
3. Multiple conveying pipes for conveying the excrement of the aquatic animals are arranged at the lower portion of the plate body. The conveying pipe is connected with the lower portions of the nets through the connecting tubes. Therefore, the efficiency of cleaning the excrement of the aquatic animals can be effectively improved. Each conveying pipe is in communication with the multiple connecting tubes. Each connecting tube is communicated with the corresponding conveying pipe. One end of the conveying pipe is closed, and the other end is located over the plate body. When the excrement needs to be cleaned, a suction pipe of an aquarium excrement cleaner only needs to fit for the ends, above the plate body, of the conveying pipes one by one to suck the excrement, but does not need to suck the excrement separately, which brings a great convenience for the user.
4. The present invention further has the advantages of simple structure, convenience in use, low manufacturing costs and the like. It can fix the aquatic weeds, and can also collect the dirt in the aquarium, thereby improving the ornamental value of the aquarium, facilitating the growth of the aquatic weeds, reducing the water pollution, shortening the dirt cleaning time, and reducing the water consumption during suction of the excrement.

Therefore, the present invention is of great significance to popularize.

DESCRIPTION OF THE EMBODIMENTS

Figure 1:
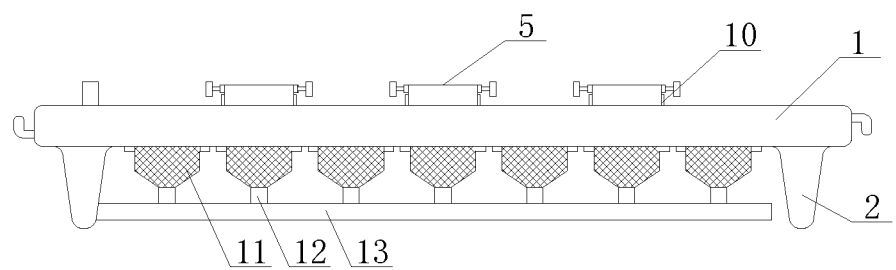
FIG. 1 is a front elevational view of an aquatic weed planting plate for an aquarium provided by an embodiment of the present invention.

The following clearly and completely describes the technical solutions in the embodiments of the present invention with reference to accompanying drawings in the embodiments of the present invention. Apparently, the described embodiments are merely a part rather than all of the embodiments of the present invention. The drawings are for illustrative purposes only, and are merely illustrative, rather than actual, and are not to be construed as limiting the scope of the present invention. To greatly describe the specific embodiments of the present invention, certain components in the drawings may be omitted, zoomed out or in, which does not represent the size of the actual product. It will be understood by those skilled in the art that certain known structures and components as well as their description may be omitted. All other embodiments obtained by a person of ordinary skill in the art based on the embodiments of the present invention without creative efforts shall fall within the protection scope of the present invention.

In the description of the present invention, it should be further noted that: unless expressly specified and defined otherwise, the terms "arrangement" and "connection" should be understood broadly. For example, "connection" may be fixed connection, detachable connection or integral connection; may also be mechanical connection or electrical connection; may be direct connection or indirect connection through an intermediate component; and may also be communication between two elements. A person of ordinary skill in the art may understand specific meanings of the foregoing terms in the present invention based on a specific situation.

Figure 2:
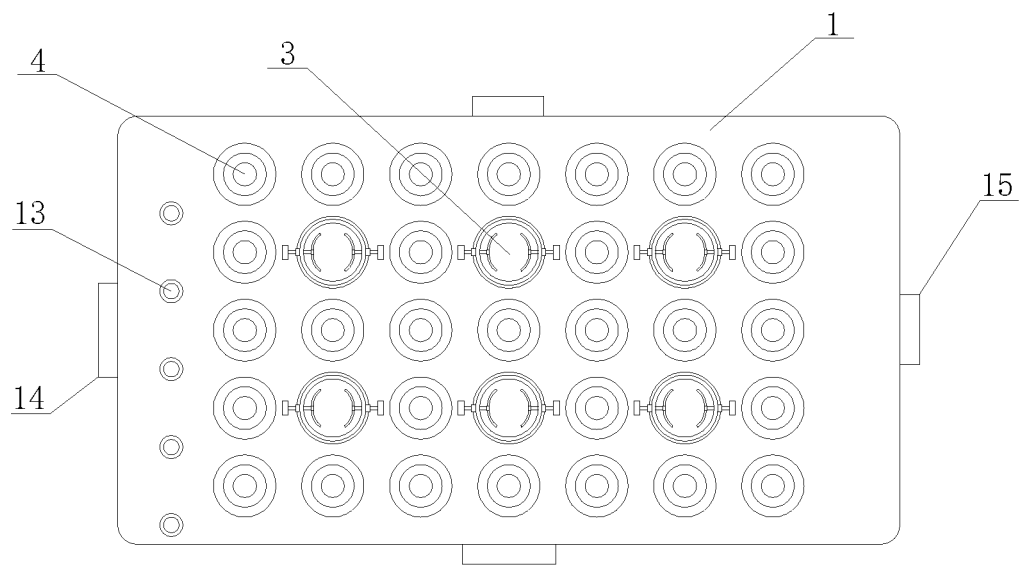
FIG. 2 is a top plan view of an aquatic weed planting plate for the aquarium provided by an embodiment of the present invention.
Figure 3:
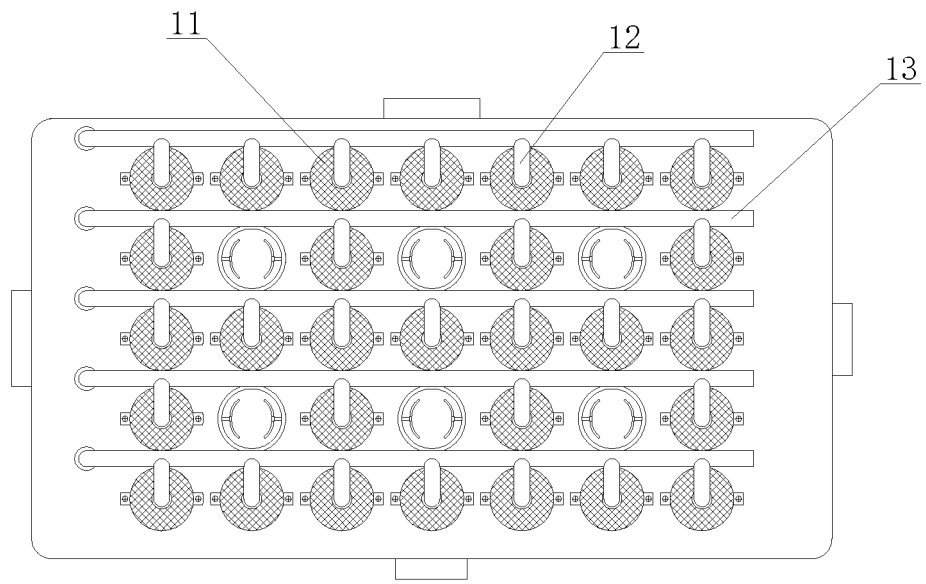
FIG. 3 is a bottom plan view of an aquatic weed planting plate for the aquarium provided by an embodiment of the present invention.
Figure 4:
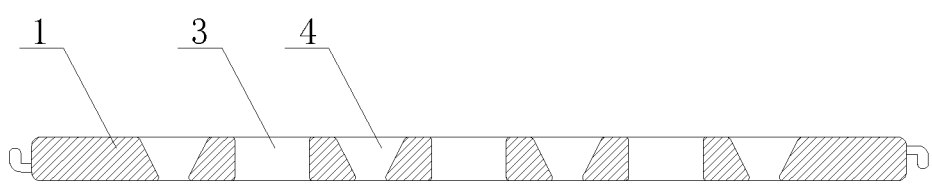
FIG. 4 is a cross-sectional view of a plate body provided by an embodiment of the present invention.
Figure 5:
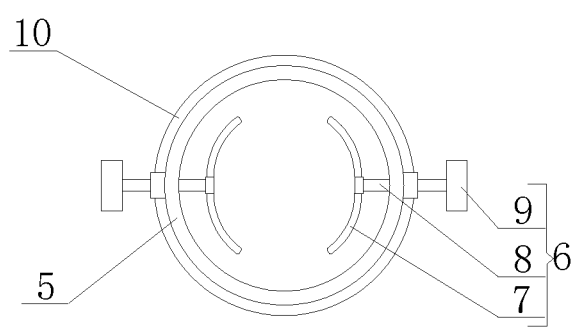
FIG. 5 is an enlarged top plan view of a fixing device provided by an embodiment of the present invention.

As shown in FIG. 1 to FIG. 5, an aquatic weed planting plate for an aquarium comprises a plate body 1 and at least four feet 2. The plate body 1 is a rectangular plate. The at least four feet 2 are arranged on the bottom surface of the plate body 1, and four corners of the bottom surface of the plate body 1 are respectively provided with one foot 2. Wherein the plate body 1 is made of ceramic, and its thickness is in the range of 5-15 mm. Therefore, the plate body 1 can greatly sink into the bottom, does not pollute the water quality, does not influence the survival of aquatic lives and has excellent ornamental value. The height of the foot 2 is in the range of 15-25 mm. Therefore, there is enough space below the plate body 1 such that the roots of aquatic weeds can greatly grow, and the plate body 1 occupies the space of an aquarium as small as possible. In the embodiment, the thickness of the plate body 1 is 10 mm. There are four feet 2. The height of the foot 2 is 20 mm.

Two adjacent sides of the plate body 1 are respectively provided with a first connector 14 while the other two sides are respectively provided with a second connector 15. The first connector 14 can be detachably connected with the second connector 15. Therefore, a user can conveniently combine multiple aquatic weed planting plates as required. In the embodiment, the first connector 14 is a clamping groove. The second connector 15 is an L-shaped clamping plate, which can be clamped with the clamping groove.

A plurality of planting holes 3 is formed in the plate body 1 at intervals. A plurality of dirt collecting holes 4 is formed around each planting hole 3. In the embodiment, there are six planting holes 3, and eight dirt collecting holes 4 are formed around each planting hole 3. The planting holes 3 and the dirt collecting holes 4 penetrate through the top surface and the bottom surface of the plate body 1. The dirt collecting hole 4 is trumpet-shaped, and its large-diameter end is positioned on the top surface of the plate body 1. The number of the planting holes 3 and the dirt collecting holes 4 can be determined based on specific situations. Or the dirt collecting holes 4 can be distributed over the whole top surface of the plate body 1 in order to collect the excrement of the fish to a maximum extent.

The plate body 1 is provided with fixing devices for fixing aquatic weeds, and each fixing device corresponds to one planting hole 3. The fixing device comprises a fixing sleeve 5, two clamping members 6 and a luminous ring 10. The fixing sleeve 5 is arranged on the plate body 1 and is coaxial with the planting hole 3, wherein the fixing sleeve 5 is detachably connected with the plate body 1, and the inner diameter of the fixing sleeve 5 is in the range of 20-30 mm. Using such arrangement, the fixing sleeve 5 has enough space for placement of the aquatic weeds, and the aquatic weeds obtain enough growth space. In the embodiment, the fixing sleeve 5 is in threaded connection with the plate body 1. The inner diameter of the fixing sleeve 5 is 25 mm. The top surface of the fixing sleeve 5 is higher than the top surface of the plate body 1. The two clamping members 6 are arranged at the upper portion of the fixing sleeve 5 and are in bilateral symmetry. The clamping member 6 comprises an arc clamping plate 7, a screw 8 and an adjustment knob 9. The two arc clamping plates 7 of the two clamping members 6 are arranged in the fixing sleeve 5, and their two recesses are disposed opposite to each other. The arc clamping plate 7 is made of soft plastic such that the arc clamping plate 7 can protect the aquatic weeds from being scratched when fixing the aquatic weeds. The middle portion of the arc clamping plate 7 is provided with a fitting part. The screw 8 is horizontally arranged. One end of the screw 8 is inserted into the fixing sleeve 5 and is rotationally connected with the fitting part of the arc clamping plate 7. The screw 8 is in threaded connection with the fixing sleeve 5. One end, outside the fixing sleeve 5, of the screw 8 is fixedly connected with the adjustment knob 9. The distance between the two clamping members 6 is adjustable such that the fixing device can be used for fixing different sizes of the aquatic weeds and has excellent universality.

The distance between the two clamping members 6 is adjusted by manually rotating the adjustment knob 9. The screw 8 is in threaded connection with the fixing sleeve 5. When the screw 8 is rotated by adjusting the adjustment knob 9, the extension length of the screw 8 in the fixing sleeve 5 can be adjusted. The arc clamping plate 7 and the screw 8 are rotationally connected through the fitting part, so the arc clamping plate 7 does not rotate with the screw 8 when the screw 8 rotates. Therefore, the fixing device can be used for fixing the aquatic weeds. During planting of the aquatic weeds, first, the aquatic weeds firstly pass through the fixing sleeve 5 and the planting hole 3 at the same time; second, the distance between the two clamping members 6 is adjusted to fix the aquatic weeds; so, the planting of the aquatic weeds is very simple. During adjustment of the clamping members 6, a proper distance is reserved between the clamping member 6 and the aquatic weeds to facilitate the growth of the aquatic weeds.

The luminous ring 10 sleeves the periphery of the fixing sleeve 5. In the embodiment, the luminous ring 10 contains the light-accumulation luminous material so as to absorb the energy in daylight or under the light and to emit the light at dark. Certainly, in other embodiments, the luminous ring 10 may emit the light by utilizing an internal LED, wherein the brightness of the LED is not high. The luminous ring 10 can effectively attract aquatic animals close to the planting hole 3. The plurality of dirt collecting holes 4 is arranged around the planting hole 3 so that excrement generated by the aquatic animals can be effectively collected. The aquatic animals have the characteristics of phototaxis and nocturnal bowl movement; so, the luminous ring emits the light and can attract the aquatic animals to move around the planting hole 3; at this time, the excrement generated by the aquatic animals can be gathered in the dirt collecting holes 4.

Smooth transition parts are arranged at four corners of the plate body 1, the edges of the dirt collecting holes 4, the edges of the planting holes 3 and the edges of the fixing sleeves 5. Therefore, the plate body 1 can effectively prevent from abrading the aquarium and scratching the aquatic animals.

The plate body 1 is provided with nets 11 for collecting dirt, and each net 11 corresponds to one dirt collecting hole 4. The net 11 is located just under the dirt collecting hole 4. The net 11 is detachably connected with the plate body 1. Therefore, the net 11 is convenient to mount and detach and can be timely cleaned and sterilized. The lower portion of the net 11 is funnel-shaped and is provided with a connecting tube 12. A plurality of conveying pipes 13 is also arranged below the plate body 1, each conveying pipe 13 is communicated with the plurality of connecting tubes 12, and each connecting tube 12 is communicated with the corresponding conveying pipe 13. In the embodiment, there are five conveying pipes 13. One end of the conveying pipe 13 is closed while the other end passes through the plate body 1 and is located above the plate body 1. The excrement gathered in the dirt collecting holes 4 finally is deposited in the nets 11. The dirt collecting hole 4 is trumpet-shaped; its large-diameter end is located on the top surface of the plate body 1 so that the dirt collecting hole 4 is convenient to collect the excrement; its small-diameter end is located on the bottom surface of the plate body 1 so that the disturbance of water flow to the excrement can be reduced. Moreover, the excrement is collected at the lower portion of the plate body 1; so, the ornamental value of the aquarium is not influenced. The excrement can not be cleaned if it does not influence the water quality; therefore, the plurality of nets 11 around the planting hole 3 can form a fertilizer ring to provide abundant nutrients for the roots of the aquatic weeds to facilitate the growth of the aquatic weeds. Additionally, the luminous ring 10 has a great decoration function to the aquarium and can improve the ornamental value of the aquarium. When the excrement needs to be cleaned, a suction pipe of an aquarium excrement cleaner only needs to fit for the ends, above the plate body 1, of the conveying pipes 13 one by one to suck the excrement, but does not need to suck the excrement separately, which brings a great convenience for the user. Even though a small quantity of excrement falls close to the dirt collecting holes 4, it can be suck into the dirt collecting holes 4 to taken away by the water flow. So, the present invention has excellent cleaning effect. The present invention has the advantages of simple structure, convenience in use, low manufacturing costs and the like. It can fix the aquatic weeds, and can also collect the dirt in the aquarium, thereby improving the ornamental value of the aquarium, facilitating the growth of the aquatic weeds, reducing the water pollution, shortening the dirt cleaning time, and reducing the water consumption during suction of the excrement. Therefore, the present invention is of great significance to popularize.

The above description is a detailed description for a preferred possible embodiment of the present invention, but the embodiment does not constitute a limitation on the scope of the present invention. Any equivalent variations, modifications or changes made according to the technical spirit disclosed by the present invention should be covered within the scope of the present invention.

What is claimed is:

1. An aquatic weed planting plate for an aquarium, comprising:
    a plate body; and
    at least four feet, wherein the plate body is a rectangular plate, the at least four feet are arranged on a bottom surface of the plate body, and four corners of the bottom surface of the plate body are each provided with one of the at least four feet, a plurality of planting holes is formed in the plate body at intervals, a plurality of dirt collecting holes is formed around each of the plurality of planting holes, the plurality of planting holes and the plurality of dirt collecting holes penetrate through a top surface and the bottom surface of the plate body, each of the plurality of dirt collecting holes is trumpet-shaped, and a large-diameter end of each of the plurality of dirt collecting holes is positioned on the top surface of the plate body, the plate body is provided with fixing devices for fixing aquatic weeds, and each of the fixing devices corresponds to one of the plurality of planting holes, each of the fixing devices comprises a fixing sleeve, two clamping members and a luminous ring, the fixing sleeve is arranged on the plate body and is coaxial with each of the plurality of planting holes, a top surface of the fixing sleeve is higher than the top surface of the plate body, the two clamping members are arranged at an upper portion of the fixing sleeve and are bilaterally symmetrical, each of the two clamping members comprises an arc clamping plate, a screw and an adjustment knob, the arc clamping plate of each of the two clamping members is arranged in the fixing sleeve, and a recess of the arc clamping plate of each of the two clamping members are disposed opposite to each other, a middle portion of the arc clamping plate is provided with a fitting part, the screw is horizontally arranged, a first end of the screw is inserted into the fixing sleeve and is rotationally connected with the fitting part of the arc clamping plate, the screw is in threaded connection with the fixing sleeve, a second end of the screw outside the fixing sleeve is fixedly connected with the adjustment knob, the luminous ring sleeves a periphery of the fixing sleeve, the plate body is provided with nets for collecting dirt, and each of the nets corresponds to one of the plurality of dirt collecting holes, each of the nets is located just under the one of the plurality of dirt collecting holes, a lower portion of the net is funnel-shaped and is provided with a connecting tube, a plurality of conveying pipes is also arranged below the plate body, each of the plurality of conveying pipes is communicated with at least a portion of the plurality of connecting tubes, and each of the plurality of connecting tubes is communicated with a corresponding one of the plurality of conveying pipes, a first end of each of the plurality of conveying pipes is closed while a second end passes through the plate body and is located above the plate body.

2. The aquatic weed planting plate for the aquarium according to claim 1, wherein the plate body is made of ceramic, and a thickness of the plate body is in a range of 5-15 mm.

3. The aquatic weed planting plate for the aquarium according to claim 1, wherein a height of each of the at least four feet is in a range of 15-25 mm.

4. The aquatic weed planting plate for the aquarium according to claim 1, wherein the fixing sleeve is detachably connected with the plate body, and an inner diameter of the fixing sleeve is in a range of 20-30 mm.

5. The aquatic weed planting plate for the aquarium according to claim 4, wherein the fixing sleeve is in threaded connection with the plate body.

6. The aquatic weed planting plate for the aquarium according to claim 1, wherein smooth transition parts are arranged at the four corners of the bottom surface of the plate body, edges of each of the plurality of dirt collecting holes, edges of each of the plurality of planting holes, and an edge of the fixing sleeve of each of the fixing devices.

7. The aquatic weed planting plate for the aquarium according to claim 1, wherein the nets are detachably connected with the plate body.

8. The aquatic weed planting plate for the aquarium according to claim 1, wherein the arc clamping plate of each of the two clamping members is made of soft plastic.

9. The aquatic weed planting plate for the aquarium according to claim 1, wherein first and second adjacent sides of the plate body are respectively provided with a first connector while third and fourth sides are respectively provided with a second connector, wherein the first connector can be detachably connected with the second connector.

* * * * *